Sept. 19, 1967
J. O. MELTON ETAL
3,342,513
BALL AND SOCKET JOINT
Filed Oct. 22, 1964
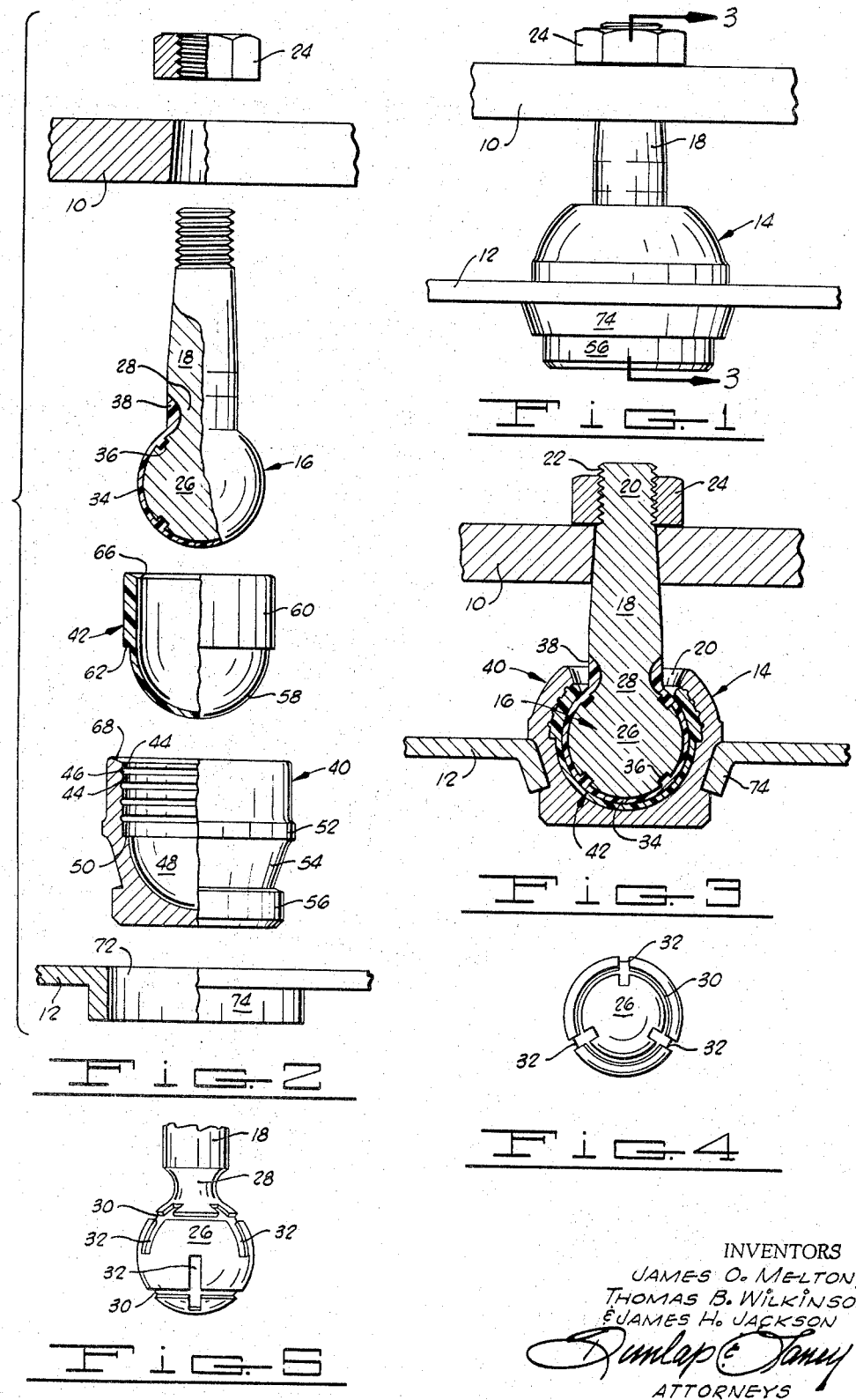
INVENTORS
JAMES O. MELTON,
THOMAS B. WILKINSON
& JAMES H. JACKSON
*Dunlap & Laney*
ATTORNEYS

United States Patent Office 3,342,513
Patented Sept. 19, 1967

3,342,513
BALL AND SOCKET JOINT
James O. Melton, 1208 Cruce St., Norman, Okla. 73069;
and Thomas B. Wilkinson, 5925 S. Eggleston 73109;
and James H. Jackson, 1730 N. Shawnee 73107, both
of Oklahoma City, Okla.
Filed Oct. 22, 1964, Ser. No. 405,771
1 Claim. (Cl. 287—90)

ABSTRACT OF THE DISCLOSURE

A ball and socket joint and method of making the same in which a metallic socket casing is formed and has a generally cylindrical first end portion and second end portion containing a hemispherical cavity. A synthetic resin liner is placed in the cavity and is seated by the mating of protuberant shoulders on the liner and in the cavity of the casing. A rigid ball member having a metallic spherical portion covered with synthetic resin is then placed in the cavity so that the ball member is in abutting and mating contact with a hemispherical end portion of the liner. The generally cylindrical end portion of the socket casing is then crimped inwardly to a frusto-spherical configuration to lock liner and ball member within the casing.

---

This application relates to a new ball and socket joint which is used to interconnect two members which move relatively to each other in more than one plane of movement. More particularly, the present invention relates to a ball and socket joint of the type having at least one of the bearing faces of the joint constructed of a high density synthetic resin, and being especially adapted for use in the steering mechanism of automobiles.

A great amount of work has recently been done to construct improved ball and socket joints for heavy duty usage, in which joints, various types of thermoplastic materials having a relatively low coefficient of friction, and being considerably less expensive than ball bearings and the like have been employed as bearing elements. Among the improvement which have been proposed in joints in which synthetic resins are utilized to form at least one of the bearing surfaces are (a) to completely seal the joint so that relatively little infiltration of deleterious materials to the interior of the joint can occur during operation and so that no lubrication of the joint is required, (b) to reduce the number of moving parts of the joint so as to minimize the possibility of failure of the joint and to reduce the cost thereof, and (c) to improve the mechanical strength of the joint by making the joint more compact and its moving parts better supported and reinforced during operation of the joint.

The present invention comprises a further improvement in ball and socket joints of the type in which at least one of the bearing surfaces is constructed of a high density synthetic resin of good frictional properties. More specifically, the present invention relates to a ball and socket joint in which a sheath of a strong, durable, high density synthetic resin of low coefficient of friction is applied to a metallic sphere and is secured thereto by a strong mechanical interlock. The high density synthetic resin sheath of the ball member thus formed bears against a synthetic resin socket liner which is of one-piece construction and is completely enclosed within and interlocked with a steel or other strong metallic socket casing. One of the most important features of the structure of the ball and socket joint thus formed is the continuous and complete support at all points of both of the high density synthetic resin bearing surfaces by mechanically strong metallic backup structure so that no stresses are placed upon the resin bearing surfaces which are not transmitted directly to the supporting metal. Moreover, there are no spaces provided within the socket member into which the high density synthetic resin bearing elements can be extruded when stresses are placed upon the resin at certain points within the socket.

In a preferred embodiment of the invention, the metallic socket casing is pressed into an aperture in a metallic plate and the plate is then crimped around and into a mating groove formed in the socket casing to provide a positive interlock which assures that the socket will be retained in the proper position in the plate. The plate which is crimped around the socket casing may either be one of the relatively moving members which the joint is used to interconnect, or it may be a relatively small plate carrying suitable bolt holes and thereby being adapted for attachment to one of the two relatively moving members to be interconnected.

In yet another of its aspects, the invention is directed to a novel method for fabricating the ball and socket joint of the invention, which method permits the joint to be made substantially stronger and permits relatively few parts to be employed in the joint. The joint can be expeditiously and economically made by the method.

From the foregoing summary description of the invention, it will have become apparent that a major object of the invention is to provide a structurally strong ball and socket joint which is especially well adapted for use in the steering mechanism of an automobile.

An additional object of the present invention is to provide a ball and socket joint useful for interconnecting two relatively moving members and employing high density synthetic resin materials for forming the two relatively movable contacting bearing surfaces in the joint.

An additional object of the present invention is to provide a ball and socket joint having only four parts in its finished form and having only two parts in bearing contact with each other.

Another object of the present invention is to provide a ball and socket joint which does not require lubrication during its normal service life.

Another object of the invention is to provide a ball and socket joint, the socket of which can be quickly and positively interlocked with a metallic plate which may be one of two relatively moving members to be interconnected by the joint, or may be an adapter plate used to quickly connect the joint to one of two such members.

Another object of the invention is to provide a ball and socket joint which is characterized in having no void space within the socket to permit deleterious materials to accumulate, or to permit the resins used in constructing the bearing surfaces of the joint to be extruded.

Additional objects and advantages of the invention will become apparent as the following detailed description of the invention is read in conjunction with a perusal of the accompanying drawings which illustrate my invention.

In the drawings:

FIGURE 1 is a view in elevation of the ball and socket joint of the present invention as it is used to interconnect two relatively moving members.

FIGURE 2 is an exploded view partially in section showing the various parts of a ball joint constructed in accordance with the present invention.

FIGURE 3 is a sectional view taken along line 3—3 of FIGURE 1 and illustrating the appearance of the interior of a socket of the joint after the joint has been assembled.

FIGURE 4 is a view showing the metallic spherical portions as it appears when viewed from its side opposite the side from which the spindle of the ball member projects.

FIGURE 5 is a view in elevation of the spherical portion of the metallic ball member used in the joint.

Referring now to the drawings in detail, and particularly to FIGURE 1, reference character 10 designates a first member, such as the upper control arm of the front end steering linkage of an automobile, which member it is desired to attach to a second member for relative movement with respect thereto. In FIGURE 1, such second member is designated by reference numeral 12 and in a typical usage of the ball and socket joint of the invention, can be the lower control arm of an automobile steering assembly.

The ball and socket joint of the invention includes a socket designated generally by reference character 14 which encloses a ball member designated generally by reference character 16. The ball member 16 is connected to a spindle 18 projecting through an aperture 20 in one side of the socket 14 as illustrated in FIGURE 3. The spindle 18 is preferably tapered to a diminished diameter at its end 20 farthest removed from the ball member 16 and carries external threads 22 on the end 20 to facilitate connection of the ball and socket joint to the first member 10. As illustrated in FIGURE 2, the first member 10 will usually have an aperture therethrough of a size to permit the end 20 of the spindle 18 to be passed through the member 10 and to be secured thereto by a suitable threaded nut 24.

The construction of the ball member 16 can best be perceived by referring to FIGURES 2 through 5. As shown in FIGURE 3, the ball member 16 includes a spherical metallic portion 26 which is preferably integrally formed with the spindle or stud 18 and connected thereto through a necked down portion 28 of the spindle. The spherical metallic portion 26 is provided with a plurality of grooves formed in its peripheral surface, including (a) circular grooves 30 formed occupying planes passed perpendicular to the axis of the spindle 18 and located relatively close to each end of the spherical member 26, and (b) intersecting equatorial grooves 32 which are extended at right angles to the grooves 30 and subtend angles of approximately 80° at the center of the spherical portion 26. It will be noted that three of the equatorial grooves 32 spaced from each other by about 120° around the metallic spherical portion 26 are formed at each end of the spherical portion 26 as best illustrated in FIGURES 4 and 5 of the drawings.

The metallic spherical portion 26 of the ball member 16 is encased in a sheath 34 of high density synthetic resin which is provided with elongated bosses or ribs 36 which correspond in number and configuration with the grooves 30 and 32 formed in the metallic spherical portion 26. The bosses or ribs 36 interlock with the grooves 32 and 30 to fix the high density synthetic resin securely in place on the spherical metallic member and to reinforce and strengthen the plastic sheath 34.

The sheath 34 is further provided with a neck portion 38 which completely fills the necked down portion 28 of the spindle 18 so that the exterior surface of the spindle is made smooth and continuous to the point where the spindle intersects the spherical portion of the synthetic resin sheath 34. A second interlock of the resin material of the sheath is thus provided with the spherical metallic portion 26 and the spindle 18. The neck portion 38 of the sheath 34 also functions to cushion the impact of the spindle 18 against the socket 14 during operation of the joint as will be hereinafter described in greater detail.

The socket 14 comprises a metallic outer casing 40, which can suitably be constructed of steel or similar high strength material, and a high density synthetic resin inner liner 42. The casing 40 carries a plurality of internal annular ribs 44 adjacent one of its ends, which ribs define between them a series of annular grooves 46. In the opposite end of the metallic casing 40, a generally hemispherical cavity 48 is formed and an annular shoulder 50 is formed in the central portion of the casing 40 at the intersection of the hemispherical cavity 48 with the series of ribs and grooves, 44 and 46, respectively. On its exterior surface, the casing 40 is provided with an annular, radially outwardly extending retaining flange 52 intermediate the length of the casing, and with a grooved or tapered portion 54 which terminates at a keying flange 56 located adjacent the end of the casing which carries the hemispherical cavity 48.

The high density synthetic resin liner 42 includes a relatively thin portion 58 which is dimensioned to mate with the hemispherical cavity 48 in the casing 40, and a relatively thick, open end portion 60 which forms a shoulder 62 at the point where the thickened end portion 60 of the liner meets the relatively thin hemispherical portion 58. The shoulder 62 of the liner abuts the annular shoulder 50 formed in the metallic casing 40 as illustrated in FIGURE 3.

The ribs and grooves 44 and 46, respectively, formed in the metallic casing 40 receive mating ribs and grooves in the outer periphery of the thickened end portion 60 of the synthetic resin liner 42 so that an interlock is formed between the liner 42 and the casing 40. It will be noted in referring to FIGURES 2 and 3 that the end faces 66 and 68, respectively, of the metallic casing 40 and liner 42 are tapered slightly downwardly and inwardly. The angle of inclination of these end faces with respect to the axis of the spindle 18 is such that the spindle can be pivoted through an average angle of about 20° before contacting the metallic casing 40 or resin liner 42 with the periphery of the spindle flatly abutting and extending parallel to these faces.

In its assembled status as shown in FIGURE 1, the ball and socket joint is pressed through an aperture 72 in the member 12. An annular flange 74 carried by the member 12 and positioned around the aperture 72 is then crimped inwardly to interlock with the grooved portion 54 of the casing 40 in the manner best illustrated in FIGURES 1 and 3.

The configuration which characterizes the various parts of the ball and socket joint prior to their assembly is illustrated in FIGURE 2 of the drawings. In a preferred method of fabricating the joints to the finished form illustrated in FIGURE 1, the metallic socket is first formed by a suitable procedure, such as by cold forming in a hydraulic press or by forging. The liner 42 is then molded from a high density synthetic resin to conform generally to the shape of the interior of the casing 40, but having no grooves or ribs formed in the relatively thickened end portion 60. Also, it will be noted that as it is initially formed, the resin liner 42 has a generally cylindrically shaped upper end portion, and a hemispherically shaped lower end portion 58 which are integrally molded to impart to the liner the pre-assembly configuration illustrated in FIGURE 2.

The spherical metallic portion 26 of the ball member 16 is also cold formed with the grooves 30 and 32 formed therein and the resin sheath 34 is then molded in place with mating ribs interlocking with the grooves 30 and 32 formed in the spherical metallic portion 26. With the ball member 16 thus formed, assembly of the joint can be commenced. The metallic casing 40 is first forced through the aperture 72 in the member 12 until the annular retaining flange 52 abuts the control arm. The annular flange 74 of the control arm is then crimped inwardly to engage the grooved portion 54 formed at one end of the casing 40. The flange 74 thus abuts against the keying flange 56 at one end of the casing 40 and the casing is thereby interlocked in the member 12. The synthetic resin liner 42 is next positioned in the metallic casing 40 with the shoulder 62 of the liner abutting the shoulder 50 inside the casing. A suitable die is next used to crimp the opened end of the casing 40 above the member 12 inwardly around the thickened portion 60 of the liner 42. The resin of the liner 42 is thus forced to assume a frusto-spherical configuration and the outer peripheral portion of the resin flows into the ribs and grooves 44 and 46, respectively, of the casing 40. The interlocking relation between the liner 42 and the casing 40 illustrated in FIGURE 3 is thus achieved. Crimping of the metallic casing 40 inwardly around the liner 42 also results in the liner being brought into abutting bearing contact with the synthetic resin sheath 34. Upon completion of the crimping operation, the member 10 may be secured on the spindle 18 by the use of the nut 24 in the manner illustrated in FIGURES 1 and 3.

It will be noted that the angle assumed by the tapered end faces 66 and 68, respectively, of the casing 40 and liner 42, respectively, upon completion of the crimping of these elements, is substantially smaller with respect to the axis of the spindle 18 than prior to the crimping. The angle assumed by the faces is, however, sufficient to permit the necessary freedom of movement of the spindle as the ball member 16 pivots in the socket 12 and the member 10 moves relatively to the member 12. It will further be noted in referring to FIGURE 3 that the neck portion 38 of the resin sheath 34 extends along the spindle 18 a sufficient distance to assure avoidance of metal-to-metal contact between the spindle and the casing 40 as the spindle of the joint is pivoted relative to the casing during operation.

It should be pointed out that as alternative procedures for constructing the ball and socket joint to that above described, the ball member 16 may initially be inserted in the socket 14 and the metallic casing 40 then crimped inwardly around the ball member, all prior to the time that the casing is interlocked with the member 12 in the manner described. In another technique, both the crimping inwardly about the casing 40 of the flange 74, and the crimping inwardly of the upper end of the casing 40 about the liner 42 and ball member 16 can be accomplished simultaneously by the use of suitable dies.

From the foregoing description of the construction and method of assembly of the ball and socket joint of the present invention, it will be perceived that the joint comprises only four basic parts, and that these parts are co-operatively associated in a way such that a mechanically strong joint of long service life is produced. The socket is completely filled with the bearing members, and each of the synthetic resin bearing surfaces is supported over its entire areal extent by metallic back-up structures of high mechanical strength. The sheath 34 is rigidly interlocked with the metallic spherical portion 26 and cannot shift thereon. Moreover, the ribs 36 of the sheath 34 reinforce the sheath and prevent it from fracturing during the use of the joint. The synthetic resin liner 42 is believed to be unique in being a one-piece structure, and the interlock which is formed between the thickened portion of the liner with the annular ribs and grooves 44 and 46, respectively, of the metallic casing 40 assures that the liner will remain in a fixed position within the socket member 16. The crimping to constrict the metallic casing 40 around the synthetic resin liner 42 work hardens the casing and gives it a high mechanical strength, and also makes possible the use of the one-piece, integrally formed liner.

The types of synthetic resins used in constructing the ball and socket joint of the present invention are of some importance. Preferably, high density synthetic resins having a differing molecular structure are used for the sheath 36 of the ball member 16 than are used for the resin liner 42. This difference in molecular structure tends to prevent interpolymerization of the two contacting bearing surfaces when the joint is heavily loaded. Typical materials which can be employed are nylon, high density polyethylene of the type sold under the tradename Marlex and polyetetrahalohydrocarbons, such as Kel-F and Teflon.

Although a preferred embodiment of the invention has been hereinbefore described in order to provide an example of the practice of the invention which will enable those having ordinary skill in the art to utilize the invention, it is to be understood that the invention contemplates various functionally equivalent structures which entail certain modifications and innovations departing in various degrees from the structure which has been illustrated and described. Insofar as these functionally equivalent structures continue to rely upon the basic principles which have been hereinbefore set forth, such structures are intended to be encompassed by the spirit and scope of the invention except as the same may be necessarily limited by the appended claim when broadly construed.

We claim:

A ball and socket joint assembly comprising:
  first and second members adapted for movement relative to each other;
  a metallic socket connected to said first member and having a frusto-spherical cavity therein and having an aperture in one side thereof entering said frusto-spherical cavity, said socket having an annular shoulder formed therein extending in a plane containing a diameter of said frusto-spherical cavity and defining the end thereof, and extending parallel to the plane truncating the cavity to impart frusto-spherical configuration thereto, said shoulder facing toward said aperture, and said metallic socket further having a plurality of grooves formed therein between said shoulder and said aperture in said frusto-spherical cavity;
  a substantially spherical and unitary synthetic resin liner in said frusto-spherical cavity having a shoulder on its outer periphery engaging said first mentioned shoulder and having ribs on the external peripheral surface thereof extending into, and interlocking with, the grooves in said cavity, said synthetic resin liner having an aperture therein aligned with the aperture in said socket, and having a smooth frusto-spherical internal surface;
  a ball member positioned inside the liner and including a generally spherical metallic portion and a synthetic resin sheath completely surrounding said metallic portion and secured thereto by interlocking ribs and grooves; and
  a spindle connected at one of its ends to said ball member and extending therefrom through said apertures and connected at its other end to said second member.

References Cited

UNITED STATES PATENTS

| | | | |
|---|---|---|---|
| 1,909,430 | 5/1933 | Skillmen | 287—90 |
| 2,635,894 | 4/1953 | Jackman | 287—90 |
| 2,885,248 | 5/1959 | White | 287—90 |
| 2,936,188 | 5/1960 | Moskovitz | 287—90 |
| 3,031,202 | 4/1962 | Melton et al. | 308—238 X |

FOREIGN PATENTS

| | | |
|---|---|---|
| 232,208 | 1/1961 | Australia. |
| 845,561 | 5/1939 | France. |
| 1,014,441 | 8/1957 | Germany. |

CARL W. TOMLIN, *Primary Examiner.*

A. V. KUNDRAT, *Assistant Examiner.*